Patented Aug. 11, 1953

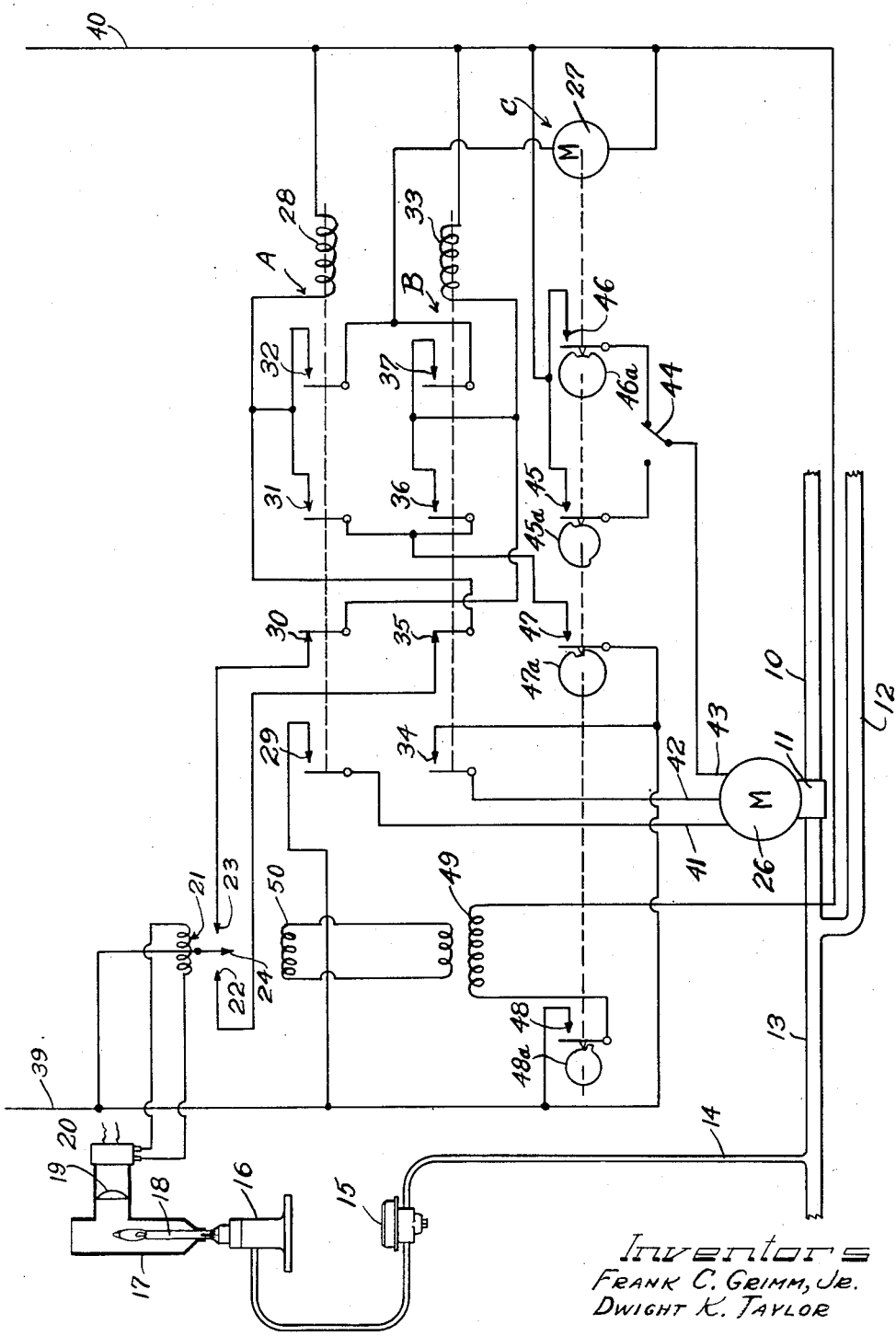

2,648,809

UNITED STATES PATENT OFFICE 2,648,809

AUTOMATIC DEVICE FOR CONTROLLING GAS AND AIR MIXTURES

Frank C. Grimm, Jr., and Dwight K. Taylor, Chicago, Ill., assignors to Connelly, Inc., Chicago, Ill., a corporation of New Jersey Application June 16, 1949, Serial No. 99,526

3 Claims. (Cl. 318—264)

This invention relates to a combination of calorimetric and electrical means for controlling gas mixtures to produce a mixture of given potential heat value and more particularly to apparatus which will control the mixture of combustible gas constituents so as to automatically maintain the thermal value of such mixture at a constant level.

In the utilization of gas mixtures for purposes requiring a supply of gas of constant thermal value, two problems normally present themselves; the first of which is, the problem of measuring the thermal value of such mixture, and the second is that of controlling the relative mixture of constituents so as to compensate for excesses and deficiencies in materials which determine the thermal value.

Apparatus for measuring the heat value of gas mixtures is disclosed in Patent 2,058,522, issued to A. L. Smyly on October 27, 1936. This apparatus comprises essentially, a modified Bunsen burner in which a sample of the gas mixture being measured is burned and a means for observing the flame of such mixture to determine its luminosity as a measure of the heat value of the gas. The burner is calibrated to enable an exact adjustment for full combustion of the standard desired mixture of such gas so that any deficiencies in the amount of air mixed with such gas and consequent inefficient combustibility will result in a yellow tip on the flame of the Bunsen burner and any excess of air will result in a darker blue flame. The luminosity of the flame of the burner is thus made to be an indication of the relative thermal value of the sample of gas being tested as compared to the thermal value of the desired mixture. As disclosed in the Smyly patent, this measure of luminosity may be made with a photoelectric cell associated with a microammeter, which may be calibrated to indicate directly the B. t. u. content of the gas mixture.

The second problem encountered in maintaining constant thermal levels in combustible gas mixtures, as mentioned above, is the problem of controlling the composition of the gas mixtures. This has been found possible of solution by associating a novel electrical circuit with the above described measuring means.

In this regard, it is one of the principal features and objects of the present invention to provide a gas mixture control means which will automatically regulate the mixture of combustible gases to maintain a predetermined substantially constant heat of combustion.

It is another object of this invention to provide novel gas mixture control apparatus governed by the thermal value of the gas mixture.

Still another object of the present invention is to provide a new combination of calorimetric means and a novel electrical control circuit which will automatically determine and maintain the heat content of a combustible gas mixture at a constant value.

A further object of the present invention is to provide a novel means for regulating mixture of air with a gas to form and maintain a combustible gas of a predetermined constant heat content regardless of the temperature and pressure of such mixture.

A still further object of the present invention is to provide a novel means for automatically governing the cycle of change of gas mixtures to attain a mixture of certain heat content in accordance with a desired standard.

Another and still further object of the present invention is to provide a novel combination which will both indicate the absolute heat content of gas mixtures and actively operate to correct the mixture of constituents to obtain a mixture of desired thermal quality.

The novel features which we believe to be characteristic of our invention are set forth with particularity in the appended claims. My invention, however, as to its organization and method of operation, together with further objects and advantages thereof, may best be understood by reference to the following description taken in connection with the accompanying drawing.

Referring to the drawing—

The drawing represents a schematic circuit diagram which shows in general the lay-out of elements of apparatus embodying the principles of the present invention.

There is illustrated an arrangement of apparatus, including an air supply line 10, a motor-operated air supply valve 11 connected therein, and a gas supply line 12 to which the air supply line 10 is joined to form a gas mixture supply line 13. A small sample line 14 is connected into the main mixture supply line 13 to enable continuous sampling of the mixture. The sample is fed through a constant pressure gas regulator 15 to a modified Bunsen burner calorimeter 16. The pressure regulator 15 may be of a conventional type, such as an adjustable spring-loaded regulator, and is adjustable to enable supply of the sample gas to the calorimeter 16 at a constant pressure, independent of pressure variations in the gas mixture line 13. An accurate measurement of the B. t. u. content of the gas mixture is thus assured without requiring calculation and compensation for pressure variations. The modified Bunsen burner 16 is calibrated as described in the aforementioned Smyly patent, and, when the flame of the gas supplied to the burner is adjusted for optimum combustion, the B. t. u. or calorie content of the burning material may be read directly from the burner calibration. A shield 17 surrounds the Bunsen burner tube 18 and directs the light from the flame through a lens 19 to a photoelectric cell and relay unit 20.

As mentioned above, the intensity of illumination of the flame of the burner 16 is dependent upon the quality of combustibility of the mixture being burned, and may be considered to have an inverse function to such quality, since the intensity of illumination from the point of the optimum mixture to poorer qualities gradually increases. In other words, the greater the deficiency of air in the mixture, the greater is the intensity of illumination, since the flame becomes more yellow with the deficiency of oxygen. As described in the Smyly patent, the flame corresponding to the mixture desired can be arranged to have just a slight yellow tip, so that excesses, as well as deficiencies, in oxygen may be more readily observed, thus enabling a more positive indication of variances from the optimum mixture. The photoelectric cell unit 20 provides an electrical signal current having a direct functional relationship to the intensity of flame illumination, which signal current is supplied to a microammeter unit 21.

The microammeter unit 21 is a form of double-pole switch or relay in that it has a pair of contacts 22 and 23 each of which is engaged by the indicator needle 24 of the microammeter unit 21, depending upon whether there is a deficiency or an excess of oxygen in the gas mixture supply line 13. The direction of operation of motor 26 of the motor-driven valve 11 is dependent upon which of the contacts 22 or 23 is engaged by the indicator needle 24.

The general arrangement of the operating circuit for motor 26 includes a set of relays A, B, and C. The relays A and B are solenoid-operated relays which perform the function of initiating a cycle of change of gas mixture by driving the motor 26 in one direction or the other and, in addition, provide the initial energization of the control elements which govern the cycle of change. Relay C is a motor-actuated timer switch unit driven by a relatively small synchronous motor 27 which drives a cam shaft to close the contacts of relay C for varying lengths of time in a manner which will be explained subsequently.

Relays A and B each have four sets of contacts, three of which are normally open and one of which is normally closed. A solenoid 28 actuates the four such contacts 29, 30, 31 and 32 of relay A. A solenoid 33 similarly actuates the corresponding four sets of contacts 34, 35, 36 and 37 of relay B. All the contacts of each relay are actuated simultaneously when their respective solenoids are energized, the normally open contacts being closed and the normally closed contacts being opened. The normally closed contacts 30 and 35 are therefore opened by energization of solenoids 28 and 33 respectively, while the normally open contacts 29, 31 and 32; and 34, 36 and 37 are closed by energization of such solenoids respectively.

Energization of the control circuit is effected by electrical power supplied by a pair of supply lines 39 and 40 connected to a suitable source of supply (not shown). Although the circuit herein described is arranged for operation on alternating current, it is obvious that only minor changes are required to cause the circuit to be operable on direct current.

The motor 26 which acts to open or close the valve 11 is provided with three leads—lead 41 which is active in energizing the motor to drive the valve 11 to a closed position, a lead 42 which energizes the motor to drive it in a direction to open valve 11, and a common lead 43 which is active in energizing the motor whenever it is driven.

The common lead 43 is connected to power supply lead 40 through a selector switch 44 which enables selection between a pair of normally open contacts 45 and 46 through which the common lead 43 may be supplied with current. As mentioned above, a synchronous motor 27 drives a cam shaft which actuates the contacts of the relay C. The contacts 45 and 46 are closed by a pair of individually associated cams 45a and 46a respectively and are provided with their own individual closure periods during the cycle of control by the master relay C. In this respect the timing period of contact 45 is made to be longer than that of contact 46 so that a selection may be had between a long period and a short period of energization of motor 26 during each cycle of control by the relay C. Thus the selector switch 44 enables a selection between a large change or a small change in position of the valve 11 and consequently it is a selection between a fast or slow change in the mixture of gases to attain the desired quality.

Whether closing or opening adjustments of the valve 11 take place is dependent upon which of the normally open contacts 29 and 34 respectively, is closed, since the closing lead 41 and the opening lead 42 respectively are connected to the power supply lead 39 through these contacts. It may be seen that closing adjustments of valve 11 may be effected when the relay A is actuated, and that opening adjustments may be effected when the relay B is actuated. Energization of the relay A or B is caused by the engagement of the microammeter needle 24, which is connected directly to the line 39, with either contact 22 or 23, respectively to form a relay selector circuit. When the needle 24 moves into contact with the contact 22, by reason of an excess in the amount of air in the gas mixture, the solenoid 28 of the relay A is energized through the normally closed contact 35 of the relay B. When the needle 24 moves into contact with the contact 23, by reason of a deficiency in the amount of air, the solenoid 33 of the relay B is energized through the normally closed contact 30 of the relay A.

It is a feature of our invention that while the relay A is energized to drive the valve 11 to a closed position, the relay B cannot be energized to move the valve in the opposite direction, because the normally closed contact 30, through which the relay B is energized, is opened. This feature also exists when the relay B is energized, since the normally closed contact 35 opens, thus preventing energization of solenoid 28 of the relay A.

Closure of the contact 32 when relay A is energized by the needle 24 moving into engagement with the contact 22, energizes the synchronous motor 27 which actuates the master relay C. This motor then closes the contacts 45 and 46 for the different periods for which the contacts are arranged to be closed, as described above.

Similarly, actuation of the relay B closes the contact 37 to energize the synchronous motor 27 and close the contacts 45 and 46 of the master relay C.

If the contacts 45 and 46 were the only ones operating in the master relay C to control the cycle of change of the valve 11, then the cycle might be interrupted at any point when the needle 24 moves from the contact with which it is in engagement at the time, thus de-energizing the circuit of the motor 26. Under these conditions the contacts 45 and 46 might still be closed upon subsequent energization of the circuit by the needle 24 and the remaining part of the cycle of operation of the relay C would have to be completed before another could be started. It therefore would be difficult to predetermine the amount of variation in the position of the valve 11 that would occur each time the circuit was energized.

It is therefore another feature of the present invention that a holding circuit is provided to assure that each time the needle 24 is deflected into contacting position, that the variation in valve setting be in accordance with a predetermined time adjustment, thus assuring that the result of each cycle of variation has a controlled effect. Such a holding circuit is provided by a normally open cam actuated contact 47 associated with a cam 47a on relay C. This contact is connected between the power supply lead 39 and in series with both the contact 31 of the relay A and the contact 36 of the relay B. The latter contacts, in turn, are connected directly in series with solenoids 28 and 33, respectively, through which connection with the power supply lead 40 is made. Thus, when either the relay A or the relay B is closed, their respective solenoids 28 and 33 will be energized to hold such relay closed as long as the contact 47 is closed. The contact 47 closes after only a short period of operation of the synchronous motor 27 and is held closed for substantially the entire remaining portion of the cycle of rotation of the cam shaft which closes it. At the end of such cycle, the contact 47 opens and is effective in de-energizing the holding circuit.

A fourth contact 48 associated with an engaging cam 48a on relay C is arranged to close for only an instant to energize a transformer 49 just before the end of each cycle of adjustment of the valve 11. This short period of energization of transformer 49 generates a voltage in the secondary of the transformer 49 for only that short instant and is effective in energizing a solenoid 50 which draws the needle 24 to a neutral position from whatever contact the needle is engaging during the cycle of valve position change. Thus, any inertia that the needle 24 might have to returning to a neutral position after the gas mixture has been adjusted to the desired quality, is overcome by the closure of the contact 48.

By way of example, which it not in any way meant to be limiting, the adjustment of timing sequence of the contacts for the relay C to obtain the desired operating results may be as follows:

The contacts 45, 46 and 47 close simultaneously after only a short period of energization of the motor 27, this time being of the order of 2 seconds. The contact 45 then opens about 30 seconds later, and approximately 15 seconds after that, the contact 46 opens and contact 48 closes. About 58 seconds after the initial closure of the contact 47, it opens along with the contact 48, thus deenergizing the control circuit and ending the control cycle.

Summarizing the operation of the control circuit: When the microammeter needle 24 indicates either an excess or a deficiency in the amount of air being mixed with the gas, relay A or B, respectively, is energized and consequently actuated to close contacts which determine the direction in which the valve motor 26 will be driven to compensate for the variance from the desired mixture. Once either the relay A or B is actuated, the other cannot simultaneously be energized. The relay C is actuated as soon as relay A or B is actuated and the common lead 43 for the valve motor 26 is energized through either the contact 45 or 46, depending on whether the selector switch 44 is set for a fast or slow change in the gas mixture. The contact 47 is closed a relatively short time after the relay C is actuated and provides a holding circuit which keeps either the relay A or B energized until a cycle of operation of relay C is completed. The period of operation of the motor 26 is determined by the contacts 45 and 46 which energize the common lead 43. If the change in position of the valve 11 is not sufficient to cause the necessary compensation to bring about the desired mixture in the gas line 13, the microammeter needle 24 after once being centered at the end of the control cycle will again move to initiate another cycle of variance. The circuit continues to operate in this manner, opening and closing the valve 11, until finally the adjustment has effected the desired mixture of gas.

An advantage of the cyclic control of our invention is that overshooting is minimized by a momentary time lag to permit the sample line 14 to become purged before additional adjustment is effected.

While we have shown a particular embodiment of our invention, it will, of course, be understood that we do not wish to be limited thereto, since modifications may be made, and we therefore contemplate by the appended claims to cover all such modifications as fall within the true spirit and scope of our invention.

We claim as our invention:

1. In a control apparatus, a pair of relays each having a plurality of contacts, a selector circuit connected to each of said relays through a contact of the other relay to selectively operate one of said relays while disabling the other, a timer switch having a plurality of contacts, said timer switch connected to a contact of each relay to be energized by operation of the selected relay, said selected relay being held operative by energization through a timer contact actuated for a predetermined period by said timer switch, and a reversible motor operating circuit including a contact of each of said relays for actuation by said selected relay to determine the direction of motor operation and a timer contact for actuation by said timer switch during a portion of said relay-holding period to determine the duration of motor operation.

2. In a control apparatus, a pair of relays each having a plurality of contacts, a selector circuit including a double pole switch connected to each of said relays through a contact of the other relay to selectively operate one of said relays while disabling the other, a timer switch having a plurality of contacts, said timer switch connected to a contact of each relay to be energized by operation of the selected relay, said selected relay being held operative by energization through a timer contact actuated for a predetermined period by said timer switch, a reversible motor operating circuit including a contact of each of said relays for actuation by said selected relay to determine the direction of motor operation and a timer contact for actuation by said timer switch during a portion of said relay holding period to determine the duration of motor operation, and a solenoid energized through another timer contact actuated momentarily after said motor operating portion of said relay holding period to neutralize said double pole switch preparatory to another operation of the apparatus.

3. In a control apparatus, a pair of relays each having a plurality of contacts, a selector circuit including a double pole switch connected to each of said relays through a contact of the other relay to selectively operate one of said relays while disabling the other, a timer switch having a plurality of contacts, said timer switch connected to a contact of each relay to be energized by operation of the selected relay, each of said relays being connected through a respective relay contact to a timer contact actuated by energization of said timer switch to hold said selected relay operative for a predetermined period, and a reversible motor operating circuit including a contact of each of said relays for actuation by said selected relay to determine the direction of motor operation and a timer contact for actuation by said timer switch during a portion of said relay holding period to determine the duration of motor operation.

FRANK C. GRIMM, JR.
DWIGHT K. TAYLOR.

References Cited in the file of this patent

UNITED STATES PATENTS

| Number | Name | Date |
|---|---|---|
| 1,686,751 | Hutton | Oct. 9, 1928 |
| 1,794,222 | Whitney | Feb. 24, 1931 |
| 1,983,429 | Albright | Dec. 4, 1934 |
| 2,058,522 | Smyly | Oct. 27, 1936 |
| 2,176,471 | Pyle | Oct. 17, 1939 |
| 2,349,521 | Schmidt | May 23, 1944 |
| 2,377,363 | Noble | June 5, 1945 |
| 2,508,441 | Adams | May 23, 1950 |